(12) United States Patent
Xie

(10) Patent No.: US 11,874,156 B2
(45) Date of Patent: Jan. 16, 2024

(54) PRECISION MEASUREMENT DEVICE

(71) Applicant: XIAMEN BANGZHONG TECHNOLOGY CO., LTD., Fujian (CN)

(72) Inventor: Jicai Xie, Xiamen (CN)

( * ) Notice: Subject to any disclaimer, the term of this patent is extended or adjusted under 35 U.S.C. 154(b) by 498 days.

(21) Appl. No.: 17/267,027

(22) PCT Filed: Dec. 26, 2019

(86) PCT No.: PCT/CN2019/128752
§ 371 (c)(1),
(2) Date: Feb. 9, 2021

(87) PCT Pub. No.: WO2020/135598
PCT Pub. Date: Jul. 2, 2020

(65) Prior Publication Data
US 2021/0302220 A1    Sep. 30, 2021

(30) Foreign Application Priority Data

Dec. 28, 2018   (CN) .......................... 201822240118.8

(51) Int. Cl.
*G01G 13/00* (2006.01)
*G01G 13/02* (2006.01)

(52) U.S. Cl.
CPC .......... *G01G 13/006* (2013.01); *G01G 13/026* (2013.01)

(58) Field of Classification Search
CPC ..... G01G 13/006; G01G 13/026; G01G 13/00
USPC .......................................................... 177/67
See application file for complete search history.

(56) References Cited

U.S. PATENT DOCUMENTS

| | | | | | |
|---|---|---|---|---|---|
| 4,172,381 | A | * | 10/1979 | Aigner | G01F 1/065 73/861.87 |
| 5,410,984 | A | * | 5/1995 | Pikus | B29B 7/82 117/204 |
| 5,616,853 | A | * | 4/1997 | Oshumi | G01B 13/16 73/37.5 |
| 5,992,230 | A | * | 11/1999 | Scarpa | G01F 3/10 73/261 |
| 6,213,289 | B1 | * | 4/2001 | Hay | F04D 7/04 406/99 |
| 6,668,223 | B2 | * | 12/2003 | Blackmore | A01D 41/127 701/50 |
| 7,604,198 | B2 | * | 10/2009 | Petersen | B64C 27/10 244/17.23 |
| 8,075,281 | B2 | * | 12/2011 | Martin | F04F 13/00 417/69 |
| 8,136,396 | B2 | * | 3/2012 | Mundo | G01F 23/38 73/317 |
| 9,273,376 | B2 | * | 3/2016 | Lutes | F27D 3/0025 |
| 11,662,201 | B2 | * | 5/2023 | Loeken | G01B 11/26 356/138 |

* cited by examiner

*Primary Examiner* — Jacques M Saint Surin

(57) ABSTRACT

A precision measurement device includes a housing and a rotor. A feed inlet is provided at an upper side of the housing. A discharge outlet is provided at a lower side of the housing. The rotor is connected to a motor. Three rings of measurement recesses are formed on the outer wall of the rotor in correspondence with the feed inlet and the discharge outlet. An upper end of the feed inlet has a trapezoid shape which is narrow at the top and wide at the bottom. The discharge outlet is disposed off-center at an ascending position of the rotation cylinder, achieving an accurate measurement effect.

2 Claims, 5 Drawing Sheets

PRECISION MEASUREMENT DEVICE

BACKGROUND OF THE INVENTION

1. Field of the Invention

The present invention relates to a precision measurement device.

2. Description of the Prior Art

In continuous production, it is very important to accurately control the weight of raw materials to produce a single product at a time. The device that can realize accurate measurement and feeding plays a vital role in the continuous production process of products, and can ensure the stability of product quality effectively. In a screw-type feeding structure, pumping air while feeding not only affects the feeding speed, but also directly affects the measurement accuracy. There are three problems with the mechanism that includes a rotor in cooperation with a housing to form a measurement recess for measuring and feeding. Firstly, as the material enters the inlet of the measurement device, it will generate shear force with the rotor. Only by slowing down the rotational speed of the rotor, the material cannot enter the measurement device in a uniform and continuous manner, directly affecting the measuring effect of the measurement device. Secondly, the measurement recess is not further divided, making the measurement not fine enough. Thirdly, because the material is fluid, it is easy to accumulate precipitation in the measurement recess, which affects the material measurement of subsequent products.

SUMMARY OF THE INVENTION

In view of the defects of the prior art, the primary object of the present invention is to provide a precision measurement device.

In order to achieve the above object, the present invention adopts the following technical solutions:

A precision measurement device comprises a housing and a rotor. The housing is hollow and forms a rotation cylinder therein. A feed inlet in communication with the rotation cylinder is provided at an upper side of the housing. A discharge outlet in communication with the rotation cylinder is provided at a lower side of the housing. The rotor is installed within the rotation cylinder. The rotor forms a sealed fit with the rotation cylinder, so as to prevent fluid leakage. The rotor is connected to a motor and driven by the motor to rotate in the rotation cylinder. Three rings of measurement recesses are formed on an outer wall of the rotor in correspondence with the feed inlet and the discharge outlet. Vertical separators are respectively provided between the rings of measurement recesses. Horizontal separators are provided between the adjacent measurement recesses in each of the rings of measurement recess. The horizontal separators of the measurement recesses are staggered in a radial direction.

An upper end of the feed inlet has a trapezoid shape which is narrow at its top and wide at its bottom. An acute-angled opening is formed between a left side of the trapezoid shape and left sides of the horizontal separators of the rotor. An acute-angled opening is formed between a right side of the trapezoid shape and right sides of the horizontal separators of the rotor.

The discharge outlet is arranged off-center at an ascending position of the rotation cylinder.

Preferably, a side wall of the housing above the discharge outlet is provided with air blowing holes corresponding in position to the measurement recesses.

DETAILED DESCRIPTION OF THE PREFERRED EMBODIMENTS

Embodiments of the present invention will now be described, by way of example only, with reference to the accompanying drawings.

Figure 1:
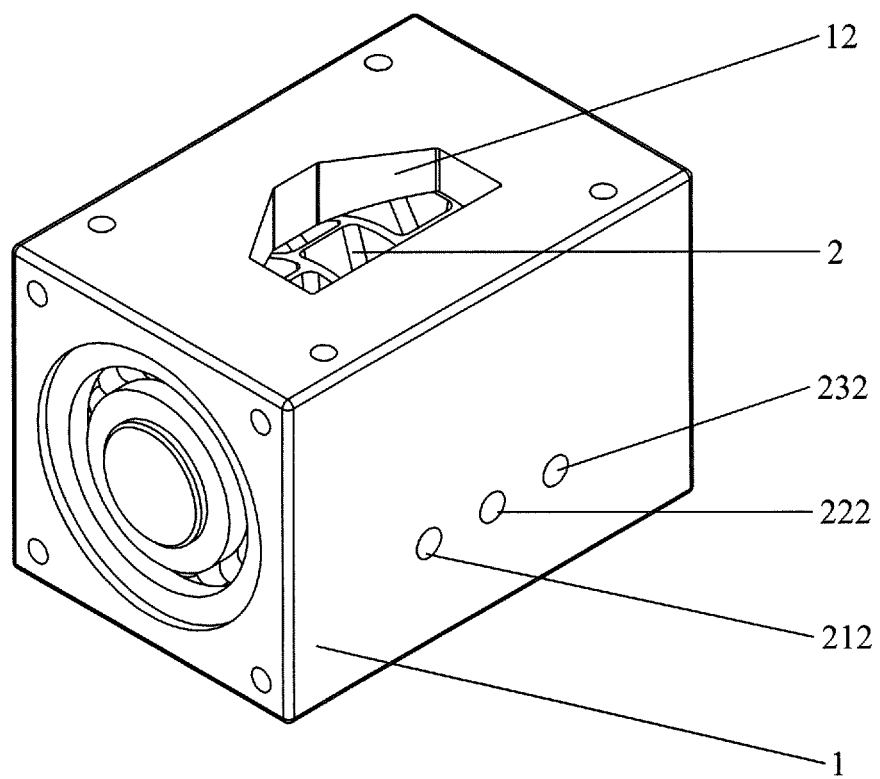
FIG. 1 is a perspective view of the present invention.
Figure 2:
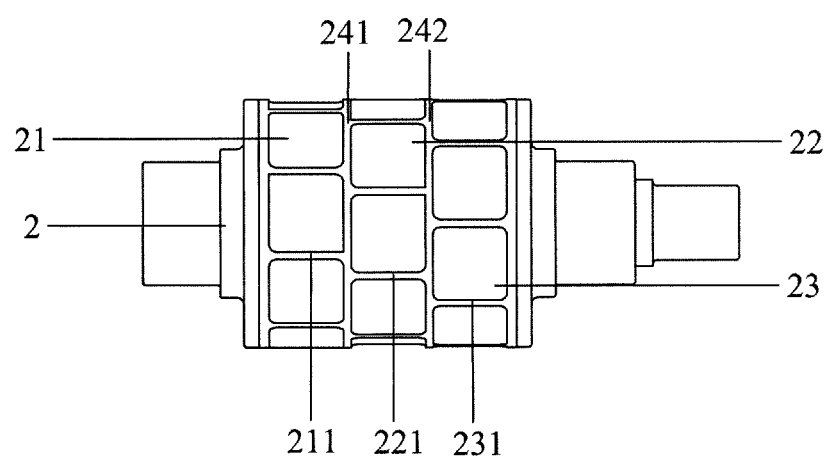
FIG. 2 is a side view of the present invention.
Figure 3:
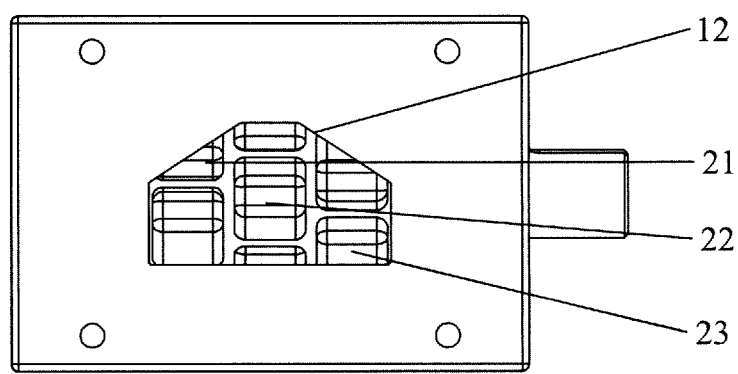
FIG. 3 is a top view of the present invention.
Figure 4:
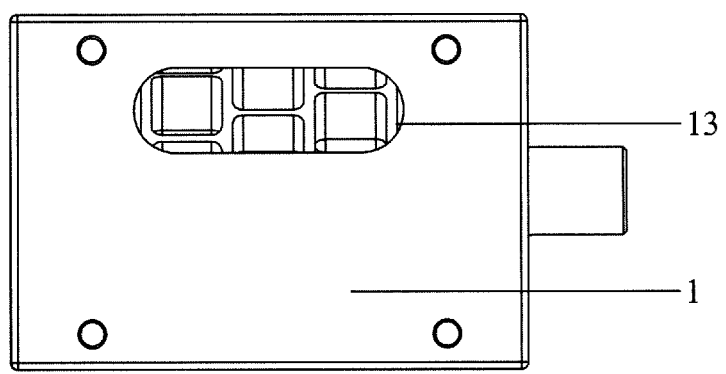
FIG. 4 is a bottom view of the present invention.
Figure 5:
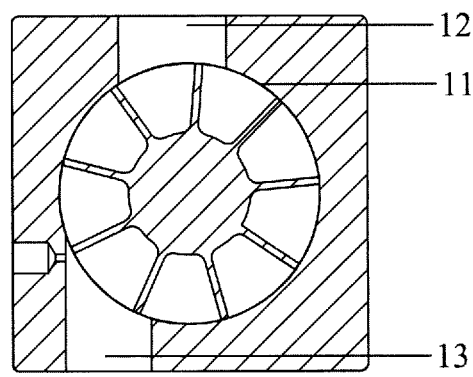
FIG. 5 is a schematic view of the present invention.

As shown in FIGS. 1 to 5, a precision measurement device comprises a housing 1 and a rotor 2. The housing 1 is hollow and a rotation cylinder 11 is formed therein. A feed inlet 12 in communication with the rotation cylinder 11 is provided at an upper side of the housing 1. A discharge outlet 13 in communication with the rotation cylinder 11 is provided at a lower side of the housing 1. The rotor 2 is installed within the rotation cylinder 11 and forms a sealed fit with the rotation cylinder 11, so as to prevent fluid leakage. The rotor 2 is connected to a motor (not shown in the drawings) and driven by the motor to rotate in the rotation cylinder 11.

Three rings of measurement recesses 21, 22, 23 are formed on the outer wall of the rotor 2 in correspondence with the feed inlet 12 and the discharge outlet 13. Vertical separators 241, 242 are respectively provided between the rings of measurement recesses 21, 22, 23. Horizontal separators 211, 221, 231 are provided between adjacent measurement recesses in each of the rings of measurement recess 21, 22, 23. The horizontal separators 211, 221, 231 of the measurement recesses 21, 22, 23 are staggered in a radial direction, so that the three rings of measurement recesses 21, 22, 23 are respectively aligned with the feed inlet 12 and the discharge outlet 13. The three rings of measurement recesses are respectively aligned with the feed inlet 12 so that the shear positions of the wheel 2 are staggered, which reduces the shear force of the rotor 2 effectively.

An upper end of the feed inlet 12 has a trapezoid shape which is wide at the top and narrow at the bottom. An acute-angled opening is formed between the left side of the trapezoid shape and the left sides of the horizontal separators 211, 221 of the rotor 2. An acute-angled opening is formed between the right side of the trapezoid shape and the right sides of the horizontal separators 231, 221 of the rotor 2. In this way, when the rotor 2 rotates, the horizontal separators 211, 221, 231 are in single-point contact with the feed inlet 12, thereby avoiding a line of contact. This also reduces the shear force of the rotor 2 greatly.

The above two designs reduce the shear force of the rotor 2 effectively. This allows the material to be fed continuously from the feed inlet 12, and provides a prerequisite for the subsequent accurate measurement of the measurement device.

The discharge outlet 13 is arranged off-center at an ascending position of the rotation cylinder 11, so that the measurement recesses 21, 22, 23 discharge the material during the ascending process. The discharge speed can be controlled and adjusted according to the rotational speed of the rotor 2. Because the horizontal separators 211, 221, 231 are staggered in the radial direction, the material in the measurement recesses 21, 22, 23 flows out from the discharge outlet 13 in turn, achieving an accurate measurement effect.

The side wall of the housing 1 above the discharge outlet 13 is provided with air blowing holes 212, 222, 232 corresponding in position to the measurement recesses 21, 22, 23 for blowing the material off the measurement recesses, so that the material falls from the discharge outlet 13, so as to avoid accumulation and precipitation of the material in the measurement recesses to affect the subsequent accurate measurement.

The beneficial effects of the present invention are that there is no need to pump air while feeding the material and the measurement accuracy will not be affected. The outer wall of the rotor is formed with the multiple rings of measurement recesses. The horizontal separators of the measurement recesses are staggered in the radial direction, so that the material in the multiple rings of measurement recesses flows out from the discharge outlet in turn to achieve accurate measurement and to reduce the shear force of the rotor at the feed inlet. In addition, the upper end of the feed inlet has a trapezoidal design that is narrow at the top and wide at the bottom, which further reduces the shear force of the rotor, so that the material falls continuously and more uniformly into the feed inlet, thereby providing a prerequisite for the subsequent accurate measurement of the measurement device. The design of the air blowing holes avoids the accumulation and precipitation of the material in the measurement recesses to affect the subsequent accurate measurement.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A precision measurement device, comprising
    a hollow housing with a feed inlet provided at an upper side thereof and a discharge outlet provided at a lower side thereof;
    a rotation cylinder formed in the housing and in communication with the feed inlet and the discharge outlet;
    a rotor installed within the rotation cylinder and forming a sealed fit with the rotation cylinder so as to prevent fluid leakage, wherein the rotor is connected to a motor and driven by the motor to rotate in the rotation cylinder;
    a left ring of measurement recesses, a middle ring of measurement recesses and a right ring of measurement recesses formed on an outer wall of the rotor in correspondence with the feed inlet and the discharge outlet;
    a left vertical separator provided between the left ring of measurement recesses and the middle ring of measurement recesses, and a right vertical separator provided between the right ring of measurement recesses and the middle ring of measurement recesses;
    horizontal separators provided between adjacent measurement recesses in each of the left ring of measurement recesses, the middle ring of measurement recesses and the right ring of measurement recesses, wherein the horizontal separators of the left ring of measurement recesses, the middle ring of measurement recesses and the right ring of measurement recesses are staggered in a radial direction;
    the feed inlet having a trapezoid-shaped upper end with a narrow top side, a wide bottom side, a left side and a right side;
    the left side of the feed inlet configured to form an acute angle with the horizontal separator of the left ring of measurement recesses and a left side of the horizontal separator of the middle ring of measurement recesses when the left ring of measurement recesses and the middle ring of measurement recesses are rotated to reach positions corresponding to the left side of the feed inlet;
    the right side of the feed inlet configured to form an acute angle with the horizontal separator of the right ring of measurement recesses and a right side of the horizontal separator of the middle ring of measurement recesses when the right ring of measurement recesses and the middle ring of measurement recesses are rotated to reach positions corresponding to the right side of the feed inlet; and
    the discharge outlet arranged off-center at an ascending position of the rotation cylinder.

2. The precision measurement device as claimed in claim 1, wherein air blowing holes are provided on a side wall of the housing above the discharge outlet corresponding in position to the left ring of measurement recesses, the middle ring of measurement recesses and the right ring of measurement recesses respectively.

* * * * *